United States Patent [19]
Buese

[11] 3,763,858
[45] Oct. 9, 1973

[54] COMPOSITE MATERIAL HAVING CEMENTITIOUS PROPERTIES

[75] Inventor: George J. Buese, East Brunswick, N.J.

[73] Assignee: Johnson & Johnson, New Brunswick, N.J.

[22] Filed: Feb. 24, 1971

[21] Appl. No.: 118,462

Related U.S. Application Data
[63] Continuation-in-part of Ser. No. 39,816, May 22, 1970, abandoned.

[52] U.S. Cl.................. 128/156, 117/122, 128/90, 128/155, 128/156, 161/160, 161/167, 161/190, 161/247, 161/255, 260/78.3
[51] Int. Cl...................... A61l 15/00, B32b 27/40
[58] Field of Search.................... 161/190, 159, 161, 161/160, 167; 156/78, 79; 117/122; 128/155, 156, 90

[56] References Cited
UNITED STATES PATENTS
| | | | |
|---|---|---|---|
| 3,360,415 | 12/1967 | Hellman et al. | 161/190 X |
| 3,307,544 | 3/1967 | Gander et al. | 161/167 |
| 3,425,890 | 2/1969 | Powers | 161/190 |
| 3,553,051 | 1/1971 | Warrack et al. | 161/190 |
| 2,740,402 | 4/1956 | Scholl | 161/167 X |
| 2,750,314 | 6/1956 | Bemmels | 161/167 X |
| 2,364,001 | 11/1944 | Schieman | 161/167 |

FOREIGN PATENTS OR APPLICATIONS
| | | | |
|---|---|---|---|
| 840,210 | 7/1960 | Great Britain | 161/190 |

Primary Examiner—Alfred L. Leavitt
Assistant Examiner—C. B. Cosby
Attorney—Jason Lipow, Harold L. Warner and Robert L. Minier

[57] ABSTRACT

A composite material, useful as a surgical, medical or orthopedic wrapping, is provided which will adhere or cohere to another surface or to itself by the application of moderate pressure either at room temperature or at an elevated temperature and will be substantially non-tacky to the touch until the application of such moderate pressure. The composite material comprises a cementitious core having bonded thereto a flexible, open cellular, resilient polymeric protective covering, the core having sufficient softness at the conditions of use to extend through the cells of the protective covering and become available at the outer surface thereof upon application of moderate pressure.

10 Claims, 7 Drawing Figures

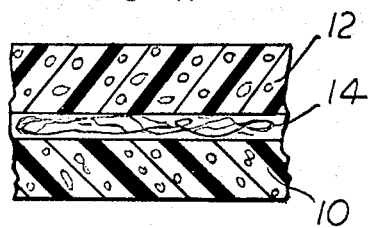
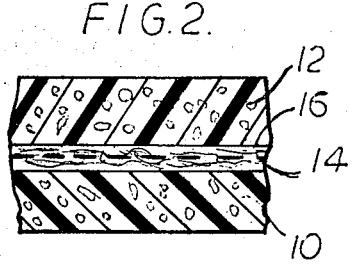
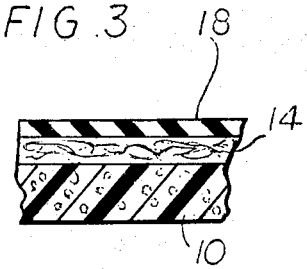
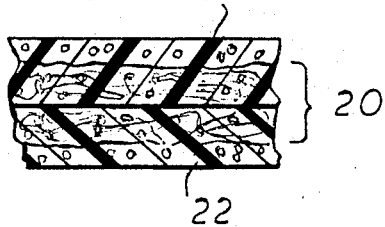
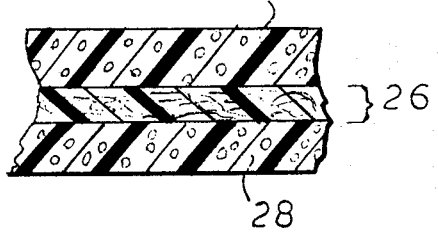
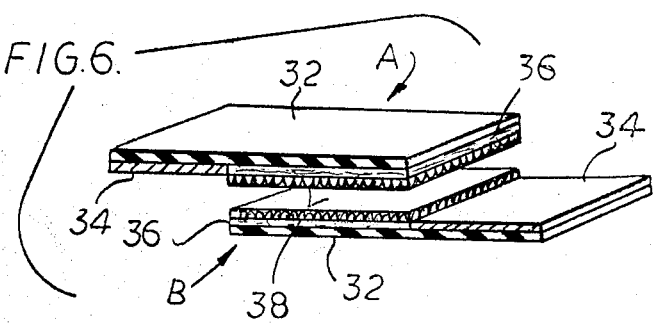
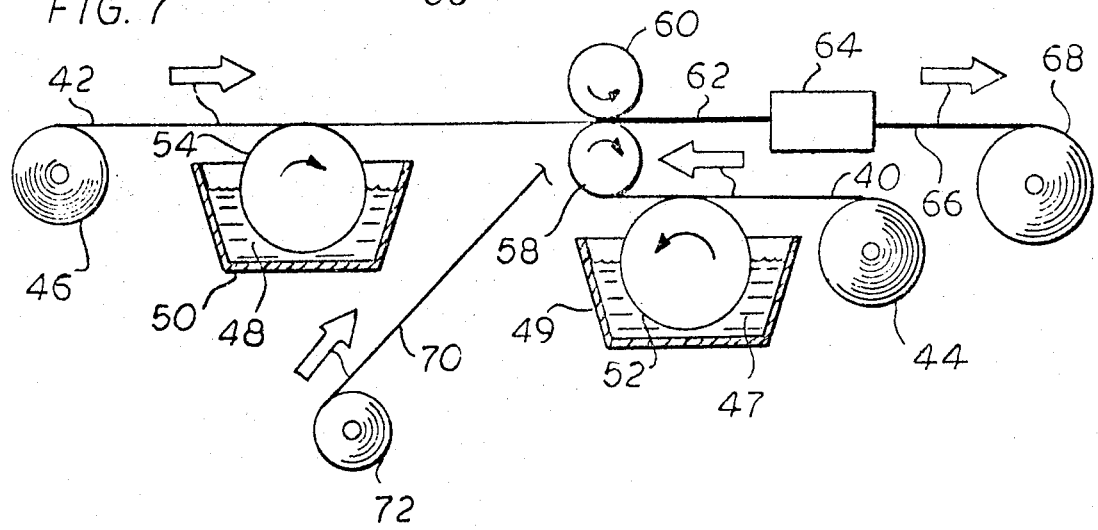

COMPOSITE MATERIAL HAVING CEMENTITIOUS PROPERTIES

CROSS REFERENCE TO RELATED APPLICATION

This is a continuation-in-part of my copending application Ser. No. 39,816, filed May 22, 1970 now abandoned.

BACKGROUND OF THE INVENTION

1. Field of the Invention

The present invention relates to a composite material, non-tacky to the touch, which will adhere to a surface or cohere to itself upon the application of moderate pressure either with or without prior heating. More specifically, in certain embodiments it relates to wrappings in the nature of adhesive or cohesive bandages, tapes, closures or the like for medical, surgical or orthopedic uses which are highly breathable, convenient to use, comfortable to wear and inexpensive to produce.

While the present invention will be described in connection with particular embodiments designed for application in the medical, surgical and orthopedic field, it should be understood that the use of the invention is not necessarily limited thereto. It can be employed for various other home, commercial and industrial applications such as, for example, as a construction material in the arts and crafts field. Other applications will become apparent to those skilled in the art from the description herein.

2. Description of the Prior Art

Wrappings are employed in the medical, surgical, and orthopedic field for a number of purposes such as, for example, holding surgical pads, bandages and the like in place or for immobilizing parts of the body as with orthopedic bandages, splints and casts. In each of these uses, it is desirable to have a wrapping which can conveniently be applied and conformed to a part of the body and which will remain in place after application and be comfortably worn. In the case of certain orthopedic uses, the wrapping should also be capable of setting into a rigid, immobilizing, supporting cast or splint.

Drawbacks have been encountered in using prior wrapping materials. For example, an overwrap bandage made of a flexible material, designed to conform to an irregularly shaped member of the body, and held in place with adhesive tape, has been used to hold surgical dressings in place. The tacky surface of the adhesive tape presents handling and unwind difficulties and collects lint, dust and dirt, thereby decreasing adhesion and presenting antiseptic problems. Because of the "quick grab" characteristic of the exposed tacky surface, it is difficult to adjust and reposition the tape as it is applied. While some attempts have been made to protect the tacky surface of adhesive tape by providing interliners, these have greatly increased the cost of the tape, necessitated an extra application step in that the interlining must first be removed and, additionally, the user is still presented with a tacky surface.

A similar problem exists in the case of certain orthopedic cast and splint forming wrappings which comprise a flexible carrier impregnated with a settable material. In my copending patent application, Ser. No. 92,096, filed Nov. 23, 1970 now abandoned, I disclose an orthopedic wrapping comprising a foam carrier impregnated therethrough with a thermoplastic polymeric material which is softened and rendered cohesive by heating to an elevated temperature. The heated, impregnated foam is then wrapped in layers around a body member and, by applying moderate pressure, the layers are cohered to one another. Upon cooling, a smooth, rigid cast is formed. It has been found that, when heated, the thermoplastic material exhibits the quick grab properties and the problems associated therewith as described above in connection with the surgical wrappings. Further, certain of the suitable thermoplastic materials disclosed in my abovereferenced copending application become tacky when heated and thereby cause inconveniences during application.

SUMMARY OF THE INVENTION

In accordance with this invention, a composite material is provided which will adhere to another surface or to itself by the application of at least moderate pressure and which is substantially non-tacky to the touch until the application of such pressure. The term "moderate pressure" is meant to denote the pressure which may be conveniently applied by hand or with the aid of a simple handheld instrument such as a spatula or the like. The composite material comprises a cementitious core having at least one flexible, open cellular, protective covering. The term "cementitous" is meant to encompass the adhesive or cohesive property of a material, exhibited either at room temperature or at an elevated temperature of use. The cementitious core has sufficient softness either at room temperature or at an elevated temperature of use to extend through the cells of the protective covering and become available for adhesion or cohesion at the outer surface of the protective covering uppon application of moderate pressure. On the other hand, the softness is insufficient to render the product inconveniently tacky and/or cohesive or adhesive until pressure is applied and so the product may be stored or heated in roll form and will exhibit no great unwind difficulties. The product may be applied to a member of the body and readjusted several times without exhibiting the aforementioned "quick grab" property, and after the product has been satisfactorily positioned, the user simply applies moderate pressure to compress the covering and make the cementitious core available for adhesion or cohesion at the exposed surface thereof. In a preferred embodiment the protective covering comprises two outer layers, at least one of which is compressible polyurethane foam.

In a specific embodiment of this invention, the core comprises a thermoplastic material which may be rendered cementitious and soft by heating to an elevated temperature. The composite material is in the form of an orthopedic wrap which can be wound into a roll for storage, heated in the roll form, applied to a body member, compressed to gain cohesion, and thereafter cooled to form a rigid cast or splint. In this particular use, the protective covering, in addition to obviating the problems associated with the tackiness and quick grab of the heated core mass, serves the added function of heat insulating the product, both from the point of view of protecting the user from discomfort in handling the product at an elevated temperature as well as preventing the core from too rapidly cooling and prematurely setting before the wrap can be properly applied.

The invention contemplates providing a protective covering of foam alternatively on one or both sides of a cementitious core, the choice of such alternative being determined primarily by the nature of the core and the ultimate use of the product. For example, when an essentially cohesive, non-adhesive, non-tacky core is used as a splint forming material, one layer of foam is sufficient to avoid unwind and quick grab problems, the non-tacky surface causing no inconvenience during application which would necessitate a second foam layer. On the other hand, where a tacky, adhesive core mass is used, to avoid the inconvenience in handling such a product, it is advantageous to employ two foam layers. Further, where the product must be used at a temperature which would discomfort either the applier or the wearer, it is advantageous to provide two layers of foam as heat insulation.

THE PROTECTIVE COVERING

The flexible, compressible, open cellular protective covering used in one or both outer layers is preferably polyurethane and may be either polyester or polyether polyurethane foam, typically having a density of about 1 to 6 pounds per cubic foot. Polyester polyurethane foams are preferred in the practice of the present invention because cell size may be more readily controlled and because of their superior tensile strength characteristics. A typical polyester polyurethane foam may be prepared, for example, as set forth in Example II of U. S. Pat. No. 2,956,310.

Generally, a suitable foam should have a degree of openness sufficient to provide exposure of the core therethrough upon the application of moderate pressure when the product is at the temperature of use. On the other hand, the degree of openness must be small enough to preclude substantial premature exposure of the core through the foam which could render the product inconveniently tacky, interfere with the unwind properties, or otherwise impede the use of the product.

While a variety of foam configurations can satisfy the degree of openness requirements of this invention, it is preferred to use reticulated foams, i.e., those foams wherein the cell walls have been removed by chemical or mechanical treatment. A good measure of the degree of openness in such foams is the pore density or the number of cells per running inch (hereinafter "ppi"). I have found that the degree of openness criteria are best met by reticulated foams having a pore density of from about 20 to about 120 ppi and preferably from about 20 to 100 ppi. A limiting factor on pore density arises in that it is difficult, on a production basis, to slice foams having less than about 20 ppi below a thickness of one-eighth inch. As set forth hereinafter, foam layer thicknesses of less than one-eighth inch are preferred for many applications. Still another factor limiting use of the larger pore size foams is that they are harsher to the feel than finer pore sizes.

It should be clearly understood that while reticulated foams having the above-prescribed pore densities are preferred, other foam configurations satisfying the degree of openness criteria may be used such as, for example, sufficiently porous non-reticulated or partially reticulated foams, perforated foams and foams having combinations of these configuration characteristics. Because of the cell walls present in non-reticulated or partially reticulated foams, the preferred pore size should be somewhat larger than in the case of fully reticulated foams in order to obtain a sufficient degree of openness. For example, in a particular embodiment, using identical core material, about 80 ppi may be optimal in the case of a fully reticulated foam whereas about 60 ppi may be optimal for a partially reticulated or non-reticulated foam. The requirement for increased pore size with decreasing degree of reticulation may be modified by perforating the partially or non-reticulated foams. Accordingly, a suitably perforated non-reticulated foam may be advantageously used which has the same or even smaller pore size than a fully reticulated foam. Similarly, a reticulated foam having an insufficient degree of openness may be adequate if suitably perforated.

Because good conformability is desired for many applications and conformability is usually enhanced if the product is stretched slightly when applied, the polyurethane foam should have an extent of elasticity such that it can be stretched in any direction at least about 10 percent beyond its original dimension and return upon release and preferably about 65 to 70 percent beyond its original dimension. The ultimate elongation before rupture is typically substantially greater, e.g., about 100 to 400 percent or two to five times its original dimension.

The thickness of the foam should be no more than is sufficient to provide the desired interlining, barrier and, in the case of heat-softened cores, the desired insulative effect. An overly thick protective covering, in addition to increasing the cost of the product, adds to its bulkiness and detracts from the strength of adhesion or cohesion. For example, a surgical wrap should not be substantially in excess of one-eighth inch, as excessive thickness would render it susceptible to easy dislodgment during wear. Thus, each of the two protective outer layers is limited to about 1/16 inch or less, e.g., about 1/32 inch.

While foams as thin as 3 to 5 mils may advantageously be used, particularly in conjunction with a hard core, a preferred minimum thickness is about 8 mils to prevent weakening the product and also to facilitate manufacture in that slicing foams to such fine dimensions can be difficult and may not be feasible on a production basis. It should be noted that the use of thin foams may be facilitated if a reinforcing coating or impregnant is employed. Suitable strengthening impregnants include acrylic latex binders, thermoplastic polyurethane used in emulsion or solution form such as Estane (thermoplastic polyurethanes for solution application sold by B. F. Goodrich Chemical Co.) and ionomer resin dispersions such as described in U. S. Pat. No. 3,322,734 and presently sold by E. I. du Pont de Nemours & Company, Inc., under the trade name Surlyn D 1230. The suitability of other impregnants can readily be determined by those skilled in the art. The impregnants may be added by conventional techniques, including padding, gravure roll and the like.

For protective use around parts of the body and in non-medical and non-surgical embodiments, one or both outer layers may each have a thickness substantially greater than 1/16 inch. Also, for certain industrial uses, even substantially thicker outer layers may be employed, in which case larger pore sizes may be employed consistent with meeting tackiness specifications.

Where limited stretch or no stretch is desired and conformability is not a particular problem, a material imparting such desired stretch properties can be substituted for one of the outer layers. For example, in the closure embodiment hereinafter described which takes the form of opposed tabs which are overlapped and pressed together for cohesion, the non-contacting surfaces may comprise a substantially non-stretchable woven or non-woven fabric, paper, non-woven plastic film or the like. Also, the foam-cementitious core structure of this invention may be used solely as a securing means for attaching articles containing the same to another surface. In such instance the surface of the article itself, which could be flexible or rigid, porous or non-porous, could take the place of one of the outer layers.

Where flexible sheet material having limited or controlled elongation or stretch is desired while concomitantly maintaining two potentially cementitious sides, this can best be accomplished by incorporating between the outer foam sheets stretch-modifying means. The stretch-modifying means may be placed between the core and one or both foam sheets if the stretch-modifying means is sufficiently open to permit the core material to pass therethrough and be accessible when the foam is compressed, such stretch-modifying means being, for example, threads, open mesh gauze, and the like. If the stretch-modifying means is incorporated within the core, it is not necessary that the same be pervious; and creped paper, closer weave fabric or other suitable means may be employed. The stretch-modifying or controlling means may be formed of elastomeric material where modified strength or enhanced return properties are desired. Thus, for example, the stretch-modifying means may be formed of rubber, polyurethane or other elastomer.

Open-cell polyurethane foams useful in preparing the structure of the present invention may be obtained from various commercial sources. These include, for example, 80 ppi, Scott reticulated foam as sold by the Foam Division, Scott Paper Company, Chester, Pennsylvania, and 65 ppi substantially non-reticulated P 4104 Foam as sold by the General Foam Division, Tenneco Chemicals, Inc., N. Y., N. Y.

While the open-cell polyurethane foams are preferred, certain functionally equivalent foams, such as, for example, vinyl foams, styrene-butadiene foams and some rubber based foams, may be substituted. Because some of these other foams are usually closed cell, perforation thereof to produce pores would be necessary, as those skilled in the art will recognize in the light of this disclosure.

THE CEMENTITIOUS CORE MATERIAL

The cementitious core can be any conventional cementitious material which has the characteristics required in the end product, the particular type per se not being part of the present invention other than being a necessary part of the claimed construction.

In the medical, surgical and orthopedic field, the core must have acceptable clinical properties, e.g., inert, essentially non-irriatating and non-allergy forming, and should preferably lend itself to sterilization. Additionally, for medical-surgical purposes, the core is preferably porous to complement the porosity of the outer layers, resulting in a product which breathes and minimizes maceration of the underlying skin. It should be noted in this connection that such porosity can be accomplished by mechanically perforating the composite product.

The core must have sufficient softness at the temperature of use to extend through the pores of at least one protective covering upon application of moderate compressive force so as to be available on the outer surface thereof for adhesion or cohesion. On the other hand, the core should not be so soft as to flow or otherwise prematurely become available at the outer surface of the covering, as for example upon unintentional application of slight pressure or merely upon the application of heat.

A useful measure of this requisite softness is the so-called "Williams" plasticity as determined, at a specific reference temperature, with a Williams Plastometer, using a ball of core material weighing 2 grams which is preheated for 15 minutes at the temperature of the test and then placed between two opposed horizontal plates protected with controlled-thickness paper. A 5 kilogram weight is applied to the uppermost plate and the separation of the plates is measured after 15 minutes, adjustment being made for the thickness of the paper. The greater the separation, the greater the plasticity or the hardness of the material. For cementitious material to be used for adhesion or cohesion by the application of moderate pressure at about room temperature, the reference temperature for determining Williams plasticities is 100° F. For those core materials which are to be used at elevated temperatures, i.e. above about 120° F., or more usually at about 150° to 200° F., the reference temperature is 180° F. I have found that materials employed in accordance with the invention should exhibit a Williams plasticity of from about 0.4 to about 8 mm. of plate separation. Preferably, the plasticities should range from about 0.7 to about 5 mm.

In the medical-surgical field suitable cementitious materials which can be formulated to meet these various requirements may be such pressure-sensitive adhesives as, for example, the well-known elastomeric-based surgical adhesive type masses and the acrylate adhesives presently used in surgical adhesive tape constructions. One operable form of the latter is a pure rubbery copolymer of isooctyl acrylate and acrylic acid in a 94:6 ratio, as described in U. S. Pat. No. 2,884,126 (Re. 24,906). Other examples of suitable adhesives are set forth in U. S. Pat. Nos. 2,877,141, 2,909,278, 3,307,544 and 3,325,459.

One may use as suitable core materials the commercially available natural rubber latices designated "Uniroyal NC400 M-30" and "Uniroyal 11-35X creamed 356" as sold by United States Rubber Company. Other suitable commercially available rubbers, which are cohesive, include, for example, Natsyn 400, 410 and 450. These are essentially synthetic cis-polyisoprene rubbers and are sold by The Goodyear Tire and Rubber Co. These rubbers should preferably have antioxidants incorporated so as to prevent their deterioration. Some of the self-adhering silicone rubbers that are suggested in U. S. Pat. No. 3,439,676 may also be satisfactory. A number of the aforementioned materials are sterilizable, thus enhancing their use in medical-surgical embodiments.

Typical "Williams" plasticity data obtained on such materials are as follows:

| Core Material | "Williams" Plasticity, mm. (plate separation at 100°F.) |
|---|---|
| Elastomeric-based, surgical adhesive-type mass (pigmented) | 1.6–2.0 |
| Elastomeric-based, surgical adhesive-type mass (clear) | 1.8–2.2 |
| Acrylic A* | 2.1–2.4 |

| | |
|---|---|
| Acrylic B* | 1.8–2.4 |
| Natsyn 400 | 4.51–4.53 |
| Natsyn 410 | 2.12–3.56 |
| Natsyn 450 | 1.85–2.12 |
| Uniroyal NC400 M-30 | 7.95 |

*See teachings of U.S. Pat. No. 2,884,126

All of these materials produce good cementitious bandages, although some are better than others. For example, a bandage made with Natsyn 400 exhibits essentially no tack, in contrast to the undesired tackiness of a cohesive bandage made with Natsyn 450. A cohesive bandage made with Uniroyal NC400 M-30 also exhibits no tack but the pressure required to obtain substantial coherence is considered excessive.

The formulation of the normally tacky material can be adjusted to decrease or eliminate the tackiness. For example, the addition of silicone fluids to a tacky material often renders it substantially non-tacky without substantially affecting coherence. Such modifications greatly expand the type of core that can be used in making non-tacky cohesive bandages, Also, because tack would no longer be a problem, foams having large pores, e.g., 20 to 50 pores per inch or even somewhat less, could be used in making satisfactory bandages if other requirements are also met.

All of the foregoing are examples of core material which may be used for adhesion or cohesion at essentially room temperature, without prior heating. In accordance with this invention, a second class of core material, particularly useful in the orthopedic field, is designed to be used at elevated temperatures, e.g., above about 120° F. and less than about 200° F. Such materials include synthetic and natural trans-1,4-polyisoprene, certain polychloroprenes, certain polycaprolactones, and equivalents thereof. Many of these polymers are characterized by being crystalline at room temperature, being non-crystalline at elevated temperatures and having a relatively rapid rate of crystallization when cooled to room temperature or below. All have the property of being moldable and cohesive at elevated temperatures while reverting to a relatively rigid form after cooling to room temperature or below, room temperature generally being considered to be in the range of about 60° to 80° F. The polymers are generally compounded with filler, pigments and antioxidants to obtain desired characteristics.

Among suitable polymers is synthetic trans-1,4-polyisoprene, which is described, for example, in British Pat. No. 1,155,556. The polyisoprene should have at least 85 percent of the isoprene units in the trans-1,4 configuration. The synthetic crystalline trans-1,4-polyisoprene may be prepared by polymerizing isoprene in a hydrocarbon or halo-hydrocarbon diluent in the presence of stereo-specific Ziegler type catalysts. The synthetic crystalline trans-1,4-polyisoprene can also be used in blends with other polymeric materials, although a major proportion, i.e., about 50 percent or more, preferably 60 percent or more, of the blend should be the trans-1,4-polyisoprene. For example, 100 parts by weight of trans-1,4-polyisoprene can be blended with up to 50 parts by weight of synthetic styrene-butadiene copolymer or acrylonitrile-butadiene copolymer without adversely effecting the useful properties of the trans-1,4-polyisoprene.

Sources of natural trans-1,4-polyisoprene which may be employed are balata, gutta percha and related gums. Preferably, purified grades are used, that is, those in which resins, which may interfere with crystallinity or add to tackiness, have been partially or completely removed.

Polymers of chloroprene which may be suitable employed include those prepared as disclosed in U. S. Pat. Nos. 2,417,034, 2,426,854, and 2,567,117 and in Maynard et al., "Journal of Polymer Sciences," 18, 227–34 (1955) and Walker et al., Proceedings of the Second Rubber Technology Conference London, 1948, 69–78. Polymerization is normally carried out using the conventional redox initiation system well known to those skilled in the art of polymerization. Although homopolymers of chloroprene are preferred, the polymer may contain a minor amount of another copolymerizable monomer. Such monomers include styrene, 1,3-butadiene, isoprene, 2,3-dichloro-1,3-butadiene, acrylic and methacrylic acids and ester and nitriles. Commercially available forms of suitable polychloroprene include Neoprene HC (E. I. du Pont de Nemours & Company, Inc.), which is about 97 percent trans-1,4-polychloroprene.

The polycaprolactone polymers which have been found suitable for the practice of the present invention are the high molecular weight polycaprolactones. These polycaprolactone resins can be represented by the structure

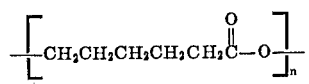

where $n$ can vary from about 100 to 1,000, depending on the particular molecular weight grade. Examples of such high molecular weight polycaprolactone polymers that are presently commercially available are PCL–300 and PCL–700 as available from Plastics Division, Union Carbide Corporation, Bound Brook, N. J. The reduced viscosities of PCL–300 and PCL–700 (0.2 g./dl. in benzene at 30° C.) are respectively 0.3 and 0.7 and correspond approximately to weight average molecular weights of 15,000 and 40,000. Further information is provided in Union Carbide's technical data bulletin entitled "New Polycaprolactone Thermoplastic Polymers PCL–300 and PCL–700."

Typical "Williams" plasticity data obtained on the foregoing thermoplastic cementitious materials are as follows:

| Core Material | "Williams" Plasticity, mm. (plate separation at 180°F.) |
|---|---|
| Polycaprolactone Compounds | 0.47–1.33 |
| Trans-polyisoprene Compounds | 1.7–2.2 |
| Trans-1,4-polychloroprene Compounds | 3.12 |

The thickness of the core depends upon the nature of the material, the thickness and nature of the outer layers and the end use of the finished product. For example in the case of cohesive bandages for use in holding pads or dressings against the skin wherein 1/32 inch outer layers of 80 ppi Scott reticulated foam are employed, the core thickness may be in the range of about 0.5 to 10 mils, whereas in the case of orthopedic wrappings, the thickness may vary from 20 to 150 mils. For other uses, however, wherein thicker foam layers may be utilized, substantially thicker cores would normally be required. In general, the optimum formulations, thicknesses, and the like can best be determined for a particular use by experimentation, as will be apparent to those skilled in the art in the light of this disclosure.

BRIEF DESCRIPTION OF THE DRAWINGS

The present invention will be more clearly understood from the following detailed description of specific embodiments, read in conjunction with the accompanying drawings, wherein:

FIG. 1 illustrates, in magnified cross section, a fragmentary portion of an embodiment of the present invention wherein two outer polyurethane foam layers and a cementitious core are employed;

FIG. 2 is similar to FIG. 1 and illustrates the embodiment wherein an open mesh web (or other material) is imbedded in the cementitious core;

FIG. 3 is similar to FIG. 1 except that one of the outer foam layers has been replaced by a fabric backing;

FIG. 4 is similar to FIG. 1 and illustrates the embodiment wherein the cementitious core overlaps into the outer foam layers;

FIG. 5 is similar to FIG. 1 except that the cementitious core comprises a mass-impregnated foam;

FIG. 6 illustrates the use of the embodiment of FIG. 3 in one form of closure; and FIG. 7 is a schematic diagram illustrating one method of producing the embodiment of FIG. 1 of the present invention.

It should be understood that the structures are represented in the drawings by graphic symbols and that the drawings are not to scale. As a result, the representations necessarily depart from the actual appearances of the various constructions.

DETAILED DESCRIPTION OF THE DRAWINGS, INCLUDING PREFERRED EMBODIMENT

Referring to FIG. 1, a preferred embodiment of the present invention comprises outer protective coverings 10 and 12 of compressible open-cell polyurethane foam, each having a thickness of about 1/32 inch and a pore count in the range of about 20 to 120 ppi. The coverings are bonded by conventional techniques to core 14 comprising a cementitious material having sufficient softness at the temperature of use to extend through the pores of coverings 10 and 12 when the latter are compressed. In a specific embodiment, the core may comprise, for example, Natsyn 400 synthetic cis-polyisoprene cohesive mass having a thickness of about 1-6 mils and a "Williams" plasticity of about 4.5 mm.

Because the core is protected by the outer foam coverings, it is not exposed to the touch or extraneous lint, dirt or dust in normal handling and presents a neat, clean appearance. It is not tacky or sticky and has good unwind properties requiring no removable interliner. Even when using a tacky mass as the core, the absence of "quick grab" permits it to be readily moved around on a surface to a desired position. Yet the structure will readily adhere or cohere upon application of moderate pressure and can be separated again and reused as desired. The non-fouling outer coverings also act as cushions to the underlying surface, e.g., a bandaged wound.

Another advantageous attribute of the embodiment of FIG. 1 is that the structure is stretchable and highly conformable, as well as being quite porous. Where limited stretch or no stretch or other characteristic is desired, materials imparting such desired properties can be added to the construction, as illustrated symbolically in FIG. 2, or substituted for one of the outer foam layers, as illustrated in FIG. 3.

Still another advantage is that, when using a material for the core which must first be heated, the coverings provide insulation protecting the user's hands as well as protecting against premature cooling and hardening of the core.

Specifically, in FIG. 2 an open mesh fabric web (or other desired material) represented by dashed line 16 may be impedded in the core. The fabric may comprise, for example, cotton gauze having 20 warp and 20 weft threads per square inch. The imbedded web 16 may also comprise a variety of other webs or strands, e.g., woven or non-woven cloth, paper (including micro-pleated and creped paper), woven or non-woven plastic, strengthening strands, filaments, rovings, elastic strands, or fibers of various types, including fiber glass, and the like. While the fabric web is illustrated as being imbedded in the middle of the core, it need not be and can be disposed adjacent an edge of the core. Also, a plurality of such webs may also be employed, e.g., a web adjacent each edge of the core. The web must not, of course, unduly interfere with the ability of the core to enter the pores of the outer form covering or coverings.

Alternatively, a non-stretch or limited stretch backing 18 may be substituted for the foam covering 12 as illustrated in FIG. 3. For example, the backing 18 may comprise a tightly woven cloth backing having 109 warp and 58 weft threads per square inch or may be formed of polymer film, paper or other flexible substantially core-impermeable material. This embodiment is particularly useful as a surgical tape or closure. The foam side has substantially no tack and yet will cohere to an opposed similar foam side when the two foam surfaces are pressed together. The backing surface, however, exhibits no tack and no cohesiveness because the tightly woven cloth layer 18 or film does not permit the core to come through.

FIG. 4 illustrates an embodiment wherein the core 20 is impregnated part way through foam layers 22 and 24. This is advantageously employed in thicker laminates, e.g., one-eighth inch or thicker. The core may penetrate to within 1/32 inch (or even possibly less) of the foam surface. Because the core is below the surface, the structure is non-tacky to the touch but, depending upon the nature of the core, may be adhered to another surface or cohered to a similar structure by pressing the same together.

A related construction is illustrated in FIG. 5 wherein the cementitious core 26 comprises a third foam layer impregnated throughout with the desired cementitious material.

The foam of cementitious core 26 may or may not be substantially identical to the porous open-cell polyurethane foam making up outer layers 28 and 30.

FIG. 6 illustrates how the embodiment of FIG. 3 may be employed as a closure having properties similar to the popular "Velcro" fishhook-type of closure. A typical closure may comprise opposed tabs A and B which are respectively secured to the two halves of a garment or the like which is to be closed, e.g., disposable surgical gown, disposable diaper or other article. Each of the tabs comprises non-stretch fabric backings 32 having an adhesive area 34 at one end of each for adhering the tabs to the respective portions of the garment or other article to be closed. The adhesive 34 may comprise, for example, a conventional hot melt or thermosettting adhesive. The other end of each tab has secured thereto a cohesive mass 36 which is covered by open-cell polyurethane foam 38. Tabs A and B form a closure simply by pressing the foam covered surfaces together whereby the foam is compressed and cohesive masses 36 contact one another and hold the tabs together.

Production of the embodiments of FIGS. 1 and 2 is illustrated in FIG. 7. Outer coverings comprising open-cell polyurethane foam layers 40 and 42 are unwound from rolls 44 and 46, respectively, and are coated with thin layers of a solution 47 and 48 of a cohesive core material, e.g., a 12 to 15 percent solids solution of Natsyn 400 synthetic cispolyisoprene mass in a mixture of xylene and toluene, from supply vessels 49 and 50 by means of coater rollers 52 and 54, respectively. Metering rolls or knives (not shown), or equivalent, may be employed to control the thickness of the mass coating. The coated foam from roller 54 joins the coated foam from roller 52 at the nip of rolls 58 and 60, where the cohesive coatings are lightly pressed together to form a laminated structure 62. The laminated structure is then dried (desolventized) in oven 64, operating at, for example, 250°F.–275°F., and the resulting product 66 is then accumulated on product roll 68.

The embodiment of FIG. 2 is produced by imbedding an open mesh fabric 70 (or other desired material) from supply roll 72 into the cohesive mass. This can be readily accomplished by introducing fabric 70 into the nip of rolls 58 and 60 where the cohesive solution layers on each of the foam layers are joined together. As a result, fabric 70 is imbedded and anchored in the cohesive mass during the drying step.

The embodiment of FIG. 3 may be produced essentially as described above in connection with the embodiment of FIG. 1 except that a non-foam, substantially impervious backing 18 is substituted for foam layer 12. The embodiment of FIG. 4 may be produced by casting a mass of core material on silicon-coated paper, and while the mass is still wet, laying the foam on top and then rolling with moderate pressure so as not to drive the mass all the way through the foam. After drying the mass and removing the silicone-coated paper, fold the mass coated foam in half, mass to mass, to make the bandage. The embodiment of FIG. 5 may be prepared by thoroughly impregnating a foam layer all the way through with the mass to produce the core 26 and then rolling outer layers 28 and 30 thereon to produce the laminated structure.

In the case of thermoplastic core material, e.g., polycaprolactone, the protective foam may be laminated to the surface or surfaces of the core material while the latter is in the heated state. For example, the core material may be first extruded and, while still hot, introduced along with the foam into the nip of laminating rolls. The thickness of the protective foam layer or layers above the core material may be controlled by adjusting the gap setting between the laminating rolls to control, in turn, the penetration of the foam into the core material.

The present invention will be more clearly understood from the following specific examples.

EXAMPLE 1

A 1/32 inch thick, stretchable, open cellular sheet of non-reticulated polyester polyurethane foam having a pore density of about 60 to about 70 ppi was dipped into a 10 percent solids solution of an acrylic mass (similar to that described in U. S. Pat. No. 2,884,126). The wet sheet was drained, dried and cured at 250° F. To this intermediate layer, two sheets of uncoated, 1/32-inch thick, stretchable, open cellular, polyester polyurethane foam were laminated. The cured mass used in this construction exhibited a Williams plasticity, at 100° F., of 2.1–2.4 mm.

At room temperature, the resulting bandage or tape was found to be very air permeable and, when wrapped around a human hand, was found to be very comfortable. The outer layers did not have a tacky or sticky feel, and the bandage was adhered to itself by the application of moderate pressure. The bandage could be removed withh ease and resecured as desired.

EXAMPLE 2

An acrylic mass similar to that of Example 1 was cast on silicon-coated paper, dried in a steam cabinet for about 2 minutes, and then blown in an oven at 250° F. for about 5 to 7 minutes. The resulting porous mass exhibited a Williams plasticity at 100°F. of 1.8 to 2.4 mm. The mass was laminated in one case to a 1/32 inch thick, stretchable, non-reticulated polyester polyurethane foam sheet having a pore density of 60–70 ppi and, in a second case, to an approximately 1/28 inch thick sheet of the same foam. After removing the silicone-coated papers, second layers of the open cellular, stretchable, non-reticulated foam having corresponding respective thicknesses were laminated to the mass surfaces.

Each of the resulting tapes or bandages was wrapped, at room temperature, around a human finger and then pressed together to gain cohesion. The cohesion for the 1/32 inch foam was slightly better than that for the 1/28 inch foam.

EXAMPLE 3

A 40 percent solids solution of a pigmented elastomericbased, surgical adhesive type mass in xylene was spread using a bar coater set at 15 mils on a 3-mil Daubert silicone-coated paper. Before the mass dried, a sheet of 20 × 12 gauze was laid on top and then on top of this was placed a sheet of 1/32 inch thick, 80 ppi, Scott reticulated foam. After laying another sheet of the silicone-coated paper on top, the sample was rolled, using light to moderate pressure so that only the lower surface of the foam was imbedded in the mass. After rolling, the upper silicone-coated sheet was removed and the remaining composite was dried in a steam cabinet for 15 minutes at 160° F.

Another mass coated foam sheet was prepared as described in the preceding paragraph but without using the gauze. The resulting two sheets were removed from their respective carriers and then placed mass-to-mass and rolled lightly to prepare a closure. The "Williams" plasticity of the mass at 100° F. was about 1.6 to 2.0 mm.

When at room temperature and pressed against itself, the closure formed a very good bond and exhibited no stretch. Because too much of a mass layer was present and was imbedded slightly too deeply in the foam, the closure exhibited slightly too much tack when pressed firmly.

EXAMPLE 4

As in Example 3, a 40 percent solids solution of a pigmented elastomeric-based, surgical adhesive type mass in xylene was spread using a bar coater set at 15 mils on 3-mil Daubert silicone-coated paper. Before the mass dried, 1/32-inch thick, 80 ppi, Scott reticulated foam was placed on the mass surface. After placing another sheet of the silicone-coated paper on top, the sample was rolled just hard enough to partially imbed the one surface of the foam in the wet mass. The upper silicone-coated paper was then removed, and the composite was dried in a steam cabinet for 15 minutes at 160° F. The "Williams" plasticity at 100° F. was about 1.6 to 2.0 mm.

The resulting mass-coated foam was removed from the silicone-coated paper and then laminated, mass surface to mass surface, to a commercially available surgical adhesive tape having a 109 × 58 cloth backing (ZO adhesive tape as sold by Johnson & Johnson) to form a closure tape.

When at room temperature and pressed foam layer to foam layer, the closure tape formed a strong bond and worked very well. The closure tape exhibited no stretch and had no tackiness on its outer surface. The foam surface also had no tack when pressed lightly and only slight tack when pressed heavily.

EXAMPLE 5

Five samples of a bandage material were prepared by spreading a 30 percent solids solution of a pigmented elastomeric based, surgical adhesive mass (same as in Examples 3 and 4) in toluene on a 4-mil silicone-coated paper by means of a bar coater, the setting of the latter being varied from 10 to 21 mils to produce the various samples. In each case, while the mass was still very wet, 1/32 inch thick, 80 ppi, Scott reticulated foam was placed on top and then rolled lightly. Following this, the composite was dried in a steam cabinet at 160° F. for 15 minutes. After drying, the mass-coated foam was removed from the carrier, folded over mass-to-mass, and rolled lightly to produce the cohesive bandage. The "Williams" plasticity at 100° F. was about 1.6 to 2.0 mm.

Inspection of the five samples showed the following:

| Sample | Bar Coater Setting in mils | *Mass Wt., oz./yd.² | Room Temperature Cohesion Treated By Hand | Porosity (Visual) |
|---|---|---|---|---|
| 1 | 10 | 0.26 | fair | very good |
| 2 | 13 | 0.44 | good when wound tightly | very good |
| 3 | 16 | 0.63 | very good | very good |
| 4 | 19 | 1.07 | very good | very good |
| 5 | 21 | 1.13 | very good | very good |

*Two layers weighed. As above indicated, two layers of foam and two layers of mass make up the bandage.

Room temperature peel cohesion tests indicated the following, when 1-inch wide samples were placed against 1-inch wide samples and rolled six times at a rapid rate with a 4½ pound roller:

| Sample | Mass Wt., oz./yd.² | Peel Cohesion, oz./in. Width |
|---|---|---|
| 1 | 0.26 | 0.7 |
| 2 | 0.44 | 2.1 to 3.1 |
| 3 | 0.63 | 5.8 to 8.1 |

EXAMPLE 6

Four additional samples were prepared as described in Example 5 except that the elastomeric-based mass differed slightly, primarily by the omission of pigment, and the solids content of the mass solution was varied. The "Williams" plasticity of the dried mass at 100° F. was about 1.8 to 2.2 mm.

Inspection of the four samples showed the following:

| Sample | Solids in Mass Solution, Wt.% | Bar Coater Setting Mils | Mass Wt., oz./yd.² (2 layers) | Room Temp. Cohesion Tested by hand | Porosity (Visual) |
|---|---|---|---|---|---|
| 1 | 20 | — | 2.79 | excellent | fair |
| 2 | 30 | 11 | — | excellent | fair |
| 3 | 20 | 10 | 0.89 | very good | very good |
| 4 | 20 | 9 | 0.68 | good | very good |

EXAMPLE 7

Four additional cohesive bandage samples were prepared using the same means as in Example 6 but using a different method of preparation. In each case, the mass was spread on a silicone-coated paper carrier, and the foam was applied while the mass was wet and then removed before the mass had a chance to dry. The mass that adhered to the one surface of the foam was then dried for 15 minutes in a steam cabinet at 160° F. The "Williams" plasticity of the dried mass at 100° C. was about 1.8 to 2.2 mm. The bandage was prepared by folding over, mass-to-mass, and then rolling lightly.

Inspection of the four samples showed the following:

| Sample | Solids in Mass Solution Wt.% | Bar Coater Setting mils | Mass Wt., oz./yd.² (2 layers) | Room Temp. Cohesion Tested by hand | Porosity (Visual) |
|---|---|---|---|---|---|
| 1 | 20 | — | 0.62 | good | very porous |
| 2 | 20 | 12 | 0.60 | not good enough | very porous |
| 3 | 30 | 14 | 1.36 | good to very good | very porous |
| 4 | 30 | 16 | 1.5 | very good | good porosity |

EXAMPLE 8

Five additional samples were prepared in the same manner as described in Example 5 except that a different mass solution was employed, i.e., a 20 percent solids solution of Natsyn 410 synthetic cis-polyisoprene in a mixture of xylene and toluene. The "Williams" plasticity of the dried mass at 100° F. was about 2.12 mm.

Inspection of the five samples showed the following:

| Sample | Bar Coater Setting mils | Mass Wt., oz./yd.² (2 layers) | Room Temp. Cohesion Tested (by hand) | Porosity (Visual) |
|---|---|---|---|---|
| 1 | 10 | 0.62 | fair | fair to good |
| 2 | 14 | 0.72 | good | good |
| 3 | 16 | 0.898 | very good | fair |
| 4 | 18 | 1.194 | very good | fair to poor |
| 5 | 20 | 1.31 | very good | poor |

EXAMPLE 9

Tests were run to ascertain the extent to which hardness of the mass plays a part in the cohesiveness of the bandages described above. In these tests Natsyn 400 synthetic cis-polyisoprene mass having a "Williams" plasticity at 100° F. of 4.53 mm. and Uniroyal NC 400 M-30 rubber latex mass having a "Williams" plasticity at 100° F. of 7.95 mm. were employed.

The bandages were prepared by laying down the mass on silicone-coated carrier paper. For the Natsyn 400, a 14.8 percent solids solution in xylene and a 16 mil bar coater setting were used. For the Uniroyal NC 400 M–30, which has a low viscosity, a 62 percent solids dispersion and an S–46(c) Meier bar were employed. While the masses were still wet, 1/32 inch, 80 ppi, Scott reticulated foam was applied and rolled lightly. After drying in a steam cabinet for 15 minutes at 160° F., the sheets were removed from the carrier paper and folded over, mass to mass, and rolled lightly to provide the bandages.

At room temperature, the bandage made with Natsyn 400 had good to very good cohesion. The bandage made with the Uniroyal NC 400 M–30 had almost no cohesion unless pressed very hard. Both samples exhibited no tack.

EXAMPLE 10

An industrial-type adhesive (reinforced reclaimed rubber mass) was spread from a 20 percent solids solution in xylene on silicone-coated carrier paper, using a 16-mil bar coater setting. While the mass was still wet, 1/32 inch thick, 80 ppi, Scott reticulated foam was placed on the surface and roller lightly. After drying in a steam cabinet at 160° F. for 15 minutes, the mass-coated foam was removed from the carrier. The mass exhibited a "Williams" plasticity of about 2.1 to 2.25 mm. at 100° F.

With the mass surface facing up, the foam was stretched longitudinally by about 30 to 50 percent and held in that position while strands of reinforcing fiber glass threads (Owens Corning B150 1/0 1Z 636), each having a breaking strength of about 4 pounds, were laid on the mass surface in parallel relationship at a spacing of about one-eighth inch to 3/16 inch. The sample was folded over longitudinally and rolled to make a glass-reinforced cohesive tape having about 14 strands of glass thread per inch width. Tension was released and the tape did shrink back by about 10 to 15 percent of the stretched length. When the tape, at room temperature, was pulled tight around a box and overlapped about 4 to 6 inches and pressed against itself, it bonded well and appeared to be a good strapping tape.

EXAMPLE 11

A core material is prepared by blending the following components in the proportion indicated:

| | Parts by Weight |
|---|---|
| Trans-1,4,polychloroprene (E.I. du Pont de Nemours & Co., Inc., Neoprene HC) | 79 |
| 2,6,di-tert-butyl-4-methyl phenol (Shell Chemical Company, Antioxidant) | 2 |
| Titanium dioxide pigment (Titanium Pigment Corporation Titanox ALO) | 6 |
| Magnesium silicate | 12 |

The above ingredients are blended in a Banbury mixer for about 5 to 8 minutes. The mixture is sheeted out to form a core material which upon heating to a temperature of 160°–180° F. exhibits a high degree of cohesiveness and essentially no tackiness. This core material has a Williams plasticity, at 180° F., of 3.12 mm.

Five samples of a splint forming material were prepared by pressing the core material to a thickness of 115–118 mils between two platens protected by silicone coated paper and heated to a temperature of 250° F. Five foam sheets of the various configurations indicated in Table 1 were each placed on a pressed core sample and then imbedded into the core by pressing. Each sample, while still warm, was wound into a roll and allowed to cool to room temperature. The rolls were heated to a suitable temperature of use, 180° F., and the unwind properties were observed and are noted in Table 1, below. To test the bond strength of samples prepared with each of the foam configurations, a sheet of each configuration was sandwiched between two layers of core material heated to 180° F. and moderate pressure was applied. The samples were cooled to room temperature and the bond strengths were observed and are noted in Table 3.

TABLE 1

| Sample | Foam Type | Approximate Pore Density (ppi) | Thickness (mil) | Unwind Properties | Bond Strength |
|---|---|---|---|---|---|
| 1 | Reticulated | 80 | 30 | good | good |
| 2 | Reticulated | 80 | 40 | good | fair to poor |
| 3 | Reticulated and perforated* | 80 | 40 | good | good |
| 4 | Reticulated | 30 | 140–142 | good | good |
| 5 | Porous, non-reticulated | 60 | 26 | good | fair |

*Perforating Industries, Linden, N.J.; Pattern 8c: 1/16 inch dia. holes, 3/32-inch staggered pattern, 132 holes per square inch.

As indicated in Table 1, all of the samples using this relatively hard, non-tacky core material exhibited good unwind properties upon heating the rolled product to 180° F., a protective coating as thin as 30 mils being sufficient. Table 1 further illustrates the importance of the degree of openness relative to the thickness of the foam and the resulting bond strength. For example, the relatively small pore sized, reticulated foam of sample 1, i.e., approximately 80 ppi, when applied in a thickness of 30 mils, produced a good bond. When, as in sample 2, the thickness was increased to 40 mils, a decrease in the bond strength was noted. This decrease could be cured, however, by providing a larger degree of openness, for example by perforating, as in sample 3. Alternatively, good bond strength could be achieved with a thick foam by increasing the degree of openness as by employing larger pore sizes such as the approximately 30 ppi reticulated foam of sample 4 wherein a good bond was obtained with an extremely thick foam of 140 to 142 mils. As illustrated in sample 5, non-reticulated but highly porous foam could produce a satisfactory bond strength provided a sufficiently large pore-sized foam was used in combination with a thin layer of foam.

EXAMPLE 12

Five samples of an orthopedic cast forming material were each prepared with a core of PXCL 4926 (substantially a mixture of high molecular weight polycaprolactone polymers and fillers) obtained from Union Carbide Corporation. The core exhibits, at a temperature above 140° F. cementitious properties and tackiness and has a Williams plasticity, at 180° F., of 0.89 mm.

For each sample, the core was pressed to a thickness of 60 mils between two platens, protected by silicone coated paper and heated to a temperature of 220° F. Each of the sample cores were sandwiched between two layers of various foam configurations and placed between the platens, again protected by silicone coated paper and heated to a temperature of 220° F. The platens are then brought together to imbed the foam layers into the core to a slight degree.

Each sample, while still warm, was wound into a roll and allowed to cool to room temperature. To test the efficacy of the samples as cast forming material, the rolls were heated to a suitable temperature of use, 180° F., and the unwind and tack properties were observed, as noted in Table 2 below.

To test the bond strengths of samples prepared with each of the foam configurations, two sheets of each configuration were sandwiched between two layers of core material heated to 180° F. and pressed by applying moderate pressure. The samples were cooled to room temperature and the resulting bond strengths observed are noted in Table 2.

TABLE 2

| Sample | Foam type | Approx. pore density (p.p.i.) | Foam thickness (mil) | Unwind properties | Tackiness | Bond strength |
|---|---|---|---|---|---|---|
| 1 | Reticulated | 80 | 40 | Good | No tack | Good. |
| 2 | do | 80 | 30 | do | do | Excellent. |
| 3 | Reticulated and perforated* | 80 | 40 | Poor | Tacky | Do. |
| 4 | Reticulated | 80 | 60 | Good | No tack | Fair to good. |
| 5 | Porous, non-reticulated | 60-70 | 26 | do | do | Fair. |

*Perforating Industries Pattern 8c, supra.

As indicated by the above table, sample 1 provided an excellent cast forming material that has good unwind properties, exhibited no tackiness in the heated condition, and produced a strong bond. By decreasing the foam layer thickness, as in sample 2, the bond strength increased. In sample 3, where the thickness was maintained at 40 mils, and a perforated foam was used, an extremely strong bond resulted; however, the heated sample exhibited tackiness and unwind difficulties. By increasing the thickness of the foam used in sample 1, from 40 to 60 mils, a product having good unwind and tack characteristics resulted, but some bond strength was lost. Sample 5 indicates that a thin, large pored, non-retibulated foam may be used where bond strength is not critical, and such a product will have good tackiness and unwind properties.

EXAMPLE 13

A sample was prepared from a PXCL 4926 polycaprolactone compound having a Williams plasticity of 0.47 mm. at 180° F. The compound was extruded at a temperature of about 160°–180° F. into a sheet form having a thickness of approximately 30 mils. While still hot, a 40 mil thick, 80 ppi, reticulated foam was laminated to one surface of the sheet. The laminate was cooled to room temperature and cut into two sheets which were then heat laminated together, core material to core material, to form a composite product having a core approximately 60 mils in thickness sandwiched between two foam layers. To test the efficacy of this product as an orthopedic bandage, the composite product was cut into strips, heated to approximately 160°–165° F., formed into rolls, and allowed to cool to room temperature. The rolls, after being heated at an oven temperature of approximately 170°–180° for about 14–20 minutes, could be unrolled with ease and exhibited no tacky surface. A splint sheet was also cut from the composite product and heated for 10–15 minutes at an oven temperature of 160°–170° F. In this condition, the sheet was not tacky and could be conveniently handled. When this heated sheet was wrapped around the hand, the conformability was good and after applying moderate pressure to shape and cohere the wrapped layers and then allowing the material to cool, a strong, rigid cast was formed.

EXAMPLE 14

A composite product was made in the manner of Example 13 with the exception that a PXCL 4926 polycaprolactonic compound, having a Williams plasticity of 0.85 to 0.89 mm. at 180° F., was used. Additionally, the foam used was 1/32 inch thick, 80 ppi reticulated foam. The composite product was thereafter perforated using Perforating Industries Pattern 8c comprising one-eighth inch diameter holes on 3/16 inch centers. The perforated composite product was rolled and heated and exhibited good unwind properties and no tackiness. The heated material was applied as a cast-forming material to a human appendage and moderate pressure was applied. Upon cooling, a conformable, highly porous, strong cast was formed.

EXAMPLE 15

A core is prepared by blending the following components in the proportions indicated.

| | Parts by Weight |
|---|---|
| Trans-1,4-polyisoprene (Polymer Corporation XPRO-B-528) | 80.0 |
| Finely-divided precipitated hydrated silica (Pittsburgh HI Sil 233) | 16.0 |
| Titanium dioxide pigment (Titanium Pigment Corporation Titanox ALO) | 4.0 |
| Ionol Antioxidant (supra) | 0.8 |

The above ingredients are blended in a Banbury mixer for about 5–8 minutes. The mixture is sheeted out to form a core which upon heating to a temperature of 180° F. exhibits a high degree of cohesiveness, is non-tacky and has a Williams plasticity, at 180° F., of 2.17 mm.

Six samples of a splint forming material were prepared by pressing the core material to a thickness of 115–118 mils between two platens protected by silicone coated paper and heated to a temperature of 200° F. Six foam sheets of the various configurations indicated in Table 3 were each placed on a pressed core sample and then imbedded to a slight degree into the core by pressing. Each sample, while still warm, was wound into a roll and allowed to cool to room temperature. The rolls were heated to 180° F. and the unwind properties were observed and are noted in Table 3.

To test the bond strength of samples prepared with each of the foam configurations, a sheet of each configuration was sandwiched between two layers of core material heated to 180° F. and moderate pressure was applied. The samples were cooled to room temperature and the bond strengths were observed and are noted in Table 3.

TABLE 3

| Sample | Foam type | Pore density (p.p.i.) | Foam thickness (mil) | Number of layers | Unwind properties | Tackiness | Bond strength |
|---|---|---|---|---|---|---|---|
| 1 | Reticulated | 80 | 30 | 1 | Good | No tack | Excellent. |
| 2 | do | 80 | 40 | 1 | do | do | Good. |
| 3 | do | 80 | 60 | 1 | do | do | Poor. |
| 4 | Reticulated and perforated* | 80 | 40 | 1 | Fair to good | do | Excellent. |
| 5 | Non-reticulated | 60–70 | 26 | 1 | Not checked | do | Fair. |
| 6 | Reticulated | 30 | 140–142 | 1 | Fair | do | Good. |

*Perforating Industries Pattern 8c, supra.

Samples 1 through 3 illustrate the effect of increasing the foam thickness whereby, while unwind and tackiness properties remain good, bond strength decreases. Sample 4 shows that by perforating a given foam, bond strength increases with a concomitant degradation in unwind properties. Sample 5 shows that with this particular core material, a non-reticulated foam, even with relatively large pores, is useful only where a strong bond is not required. Sample 6 shows that a satisfactory product can be made using extremely large pored, thick foam.

MISCELLANEOUS APPLICATIONS

As those skilled in the art will recognize, the construction of the present invention lends itself to a variety of applications, both inside and outside the medical, surgical or orthopedic fields, in addition to those already suggested. It can also be modified for particular applications, one contemplated modification, already suggested hereinabove, involving the substitution of substantially rigid structure, which may be porous or non-porous, for one of the outer coverings. Thus, the invention may be utilized in making floor coverings or the like in which a tile or other floor covering material replaces, for example, backing 18 of FIG. 3, thereby providing a tile that can be moved at will until pressed into intimate contact with the surface to which it is to be adhered. Another application of this modification is using the back of a plaque or the like as one of the coverings, whereby the plaque may be readily secured to a wall surface merely by pressing it thereagainst.

Also, it is not essential that the products of the present invention be in flat or essentially sheet form. The foam may, for example, surround an inner adhesive core to form a rope-like structure. The adhesive is made available for adherence on compression of the outer foam surface. Products of this type may, for example, be useful as a caulking or filling material.

Such suggested applications are illustrative and represent only a few additional areas where the construction of the present invention may be advantageously employed. They are not to be considered in any way as limiting.

While the present invention has been described in connection with certain embodiments, many other alternatives and equivalents are considered within the spirit and scope of the invention and coverage thereof is intended by the claims hereafter appended.

1. A medical cementitious wrapping for application to a living body part comprising an open cellular foam layer, free of cementitious material in its outer depths on the body part facing side and a layer of cementitious material on the non-body part of the facing side being non-tacky at room temperature or less; said cementitious material, at body tolerable temperatures, being cementitious and sufficiently fluid to impregnate the foam layer, migrate to the body facing side, and be available there for cementation by application of moderate pressure.

2. The medical wrapping of claim 1 wherein the cementitious material has a William plasticity of about 0.4 to about 8.0 mm.

3. The medical wrapping of claim 2 wherein the foam layer is a polyurethane foam.

4. The medical wrapping of claim 2 wherein the foam is reticulated and has a pore density of about 20 to about 120 pores per inch.

5. The medical wrapping of claim 2 wherein the cementitious material comprises a pressure-sensitive adhesive.

6. The medical wrapping of claim 2 wherein the cementitious material comprises a thermoplastic polymer.

7. The medical wrapping of claim 6 wherein the cementitious material comprises polycaprolactone.

8. The medical wrapping of claim 6 wherein the cementitious material comprises trans-1,4-polyisoprene.

9. The medical wrapping of claim 6 wherein the cementitious material comprises polychloroprene.

10. The medical wrapping of claim 2 wherein the cementitious material has a porous structure.

* * * * *

PO-1050
(5/69)

UNITED STATES PATENT OFFICE
CERTIFICATE OF CORRECTION

Patent No. 3,763,858            Dated October 9, 1973

Inventor(s) George J. Buese

It is certified that error appears in the above-identified patent and that said Letters Patent are hereby corrected as shown below:

In Column 2, line 34, "uppon" should read --- upon ---.

In Column 5, line 57, "non-irriatating" should read --- non-irritating ---.

In Column 7, line 63, "effecting" should read --- affecting ---.

In Column 8, line 3, "suitable" should read --- suitably ---.

In Claim 1, line 5, after the word "part" and before the word "facing", delete the words "of the".

In Claim 1, line 5, after the word "side" and before the word "being", insert the words --;said wrapping ---.

In Claim 1, line 6, after the words "cementitious material" and before the words "at body", insert the words --- when said wrapping is ---.

In Claim 1, line 8, after the word "body" and before the word "facing", insert the word --- part ---.

Signed and sealed this 8th day of October 1974.

(SEAL)
Attest:

McCOY M. GIBSON JR.            C. MARSHALL DANN
Attesting Officer                Commissioner of Patents